US011865863B2

United States Patent
Hubert et al.

(10) Patent No.: US 11,865,863 B2
(45) Date of Patent: Jan. 9, 2024

(54) SENSORIZED HUB BEARING UNIT FOR VEHICLES

(71) Applicant: AKTIEBOLAGET SKF, Gothenburg (SE)

(72) Inventors: Mathieu Hubert, Ann Arbor, MI (US); Alessandro Garrone, Pino Torinese (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/860,763

(22) Filed: Jul. 8, 2022

(65) Prior Publication Data

US 2023/0016206 A1   Jan. 19, 2023

(30) Foreign Application Priority Data

Jul. 15, 2021   (IT) ........................ 102021000018638

(51) Int. Cl.
*B60B 27/00* (2006.01)
*F16C 19/52* (2006.01)
*G01L 5/00* (2006.01)

(52) U.S. Cl.
CPC ........ *B60B 27/0068* (2013.01); *F16C 19/522* (2013.01); *G01L 5/0019* (2013.01); *F16C 2233/00* (2013.01); *F16C 2326/02* (2013.01)

(58) Field of Classification Search
CPC ...... F16C 19/522; F16C 33/586; F16C 33/60; F16C 35/067; F16C 43/04; F16C 2233/00; F16C 2326/02; B60B 27/0068; B60B 27/0089; G01L 5/0019

See application file for complete search history.

(56) References Cited

U.S. PATENT DOCUMENTS

| 6,619,102 | B2 | 9/2003 | Salou et al. | |
|---|---|---|---|---|
| 6,658,943 | B2 | 12/2003 | McDearmon | |
| 2002/0015545 | A1* | 2/2002 | Griseri | B60B 27/02 384/589 |
| 2004/0100058 | A1* | 5/2004 | Baker | F16C 33/586 280/93.512 |
| 2006/0023985 | A1 | 2/2006 | Gradu et al. | |
| 2011/0209562 | A1 | 9/2011 | Ono et al. | |

(Continued)

FOREIGN PATENT DOCUMENTS

| EP | 2578895 | 4/2013 | | |
|---|---|---|---|---|
| GB | 1378685 | A * | 12/1974 | ............ F16C 19/522 |

(Continued)

OTHER PUBLICATIONS

Machine Translation of JP-2015055306-A (Year: 2015).*
Search Report for corresponding Italy Patent Application No. 2021000018638 dated Feb. 21, 2022.

*Primary Examiner* — Alan B Waits
(74) *Attorney, Agent, or Firm* — Reed Smith LLP (57) ABSTRACT

A sensorized hub bearing unit having at least one strain sensor for detecting, in real time, forces and moments applied to an outer ring of the hub bearing unit, in which a radially outer ring of the hub bearing unit is formed by a coupling of a first annular element and a second annular element arranged coaxially, the second annular element radially fitted and integrally inside the first annular element and at least one strain sensor arranged in line with an interface between the first annular element and the second annular element.

15 Claims, 4 Drawing Sheets

(56) References Cited

U.S. PATENT DOCUMENTS

| | | | |
|---|---|---|---|
| 2016/0031260 A1* | 2/2016 | Starck | B60B 27/0005 |
| | | | 301/109 |
| 2021/0003478 A1 | 1/2021 | Liverato et al. | |
| 2021/0170789 A1 | 6/2021 | Bertola et al. | |

FOREIGN PATENT DOCUMENTS

| | | | | |
|---|---|---|---|---|
| JP | 2015055306 A | * | 3/2015 | ............... B60B 3/00 |
| WO | 20050121733 | | 12/2005 | |

* cited by examiner

SENSORIZED HUB BEARING UNIT FOR VEHICLES

CROSS-REFERENCE TO RELATED APPLICATIONS

This application is based on and claims priority to Italian Patent Application No. 102021000018638 filed on Jul. 15, 2021, under 35 U.S.C. § 119, the disclosure of which is incorporated by reference herein.

FIELD

In wheel hub units, sensorized systems may be implemented to detect forces and moments applied to the wheel hub unit during use.

BACKGROUND

The present disclosure relates to a sensorized hub bearing unit for vehicles, having one or more strain gauges or another type of strain sensor capable of detecting forces and moments applied to the hub bearing unit.

Sensorized systems provide a vehicle control unit with information that is useful for increasing the efficiency of stability control and that can be used to optimize management of other systems, such as autonomous driving functions.

BRIEF DESCRIPTION OF THE DRAWINGS

The disclosure will now be described with reference to the attached drawings, which illustrate non-limiting exemplary embodiments thereof, in which.

DETAILED DESCRIPTION

Figure 1:
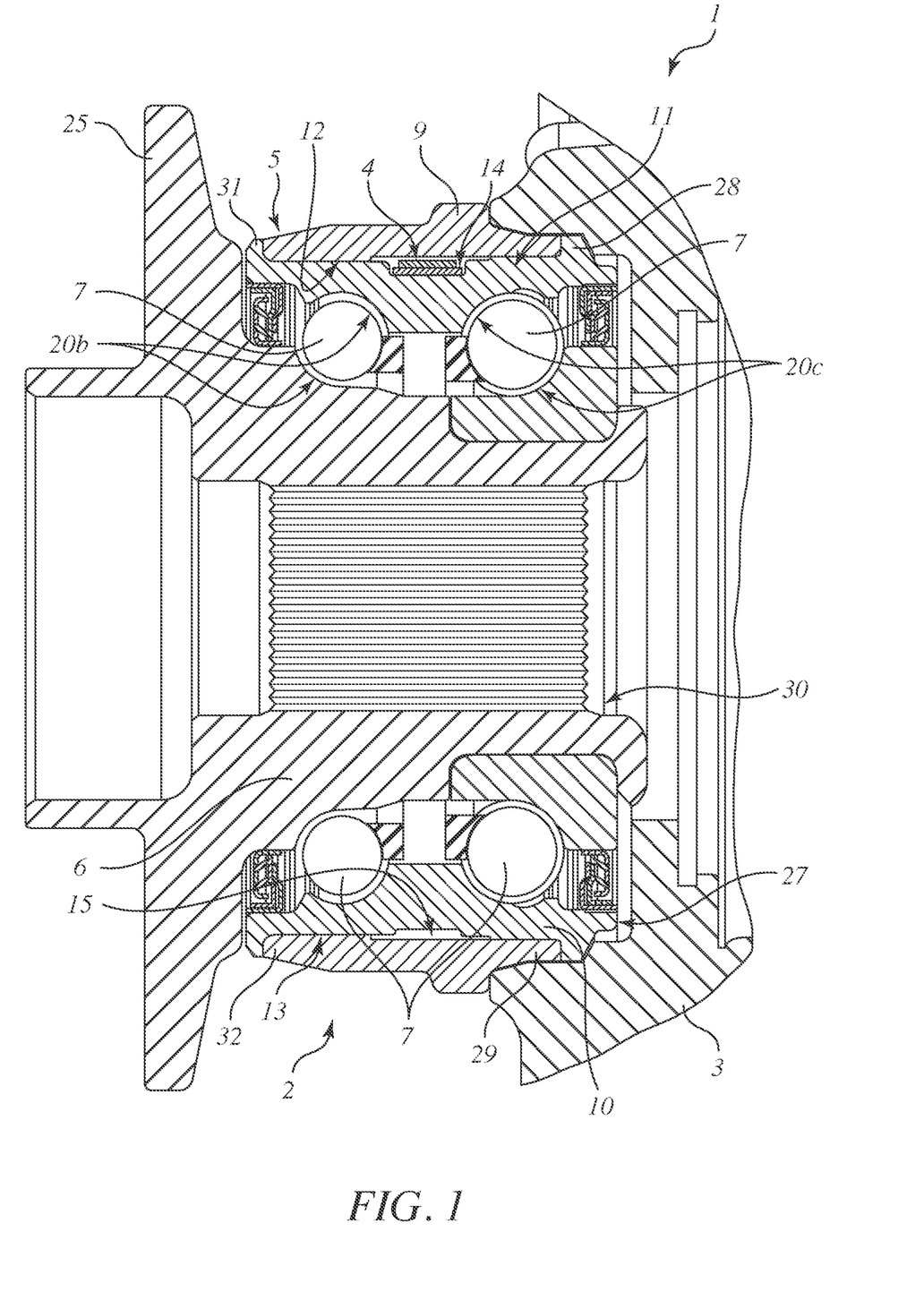
FIG. 1 schematically depicts a view in side elevation and in radial section of part of a vehicle suspension system having a sensorized hub bearing unit according to exemplary embodiments of this disclosure.
Figure 2:
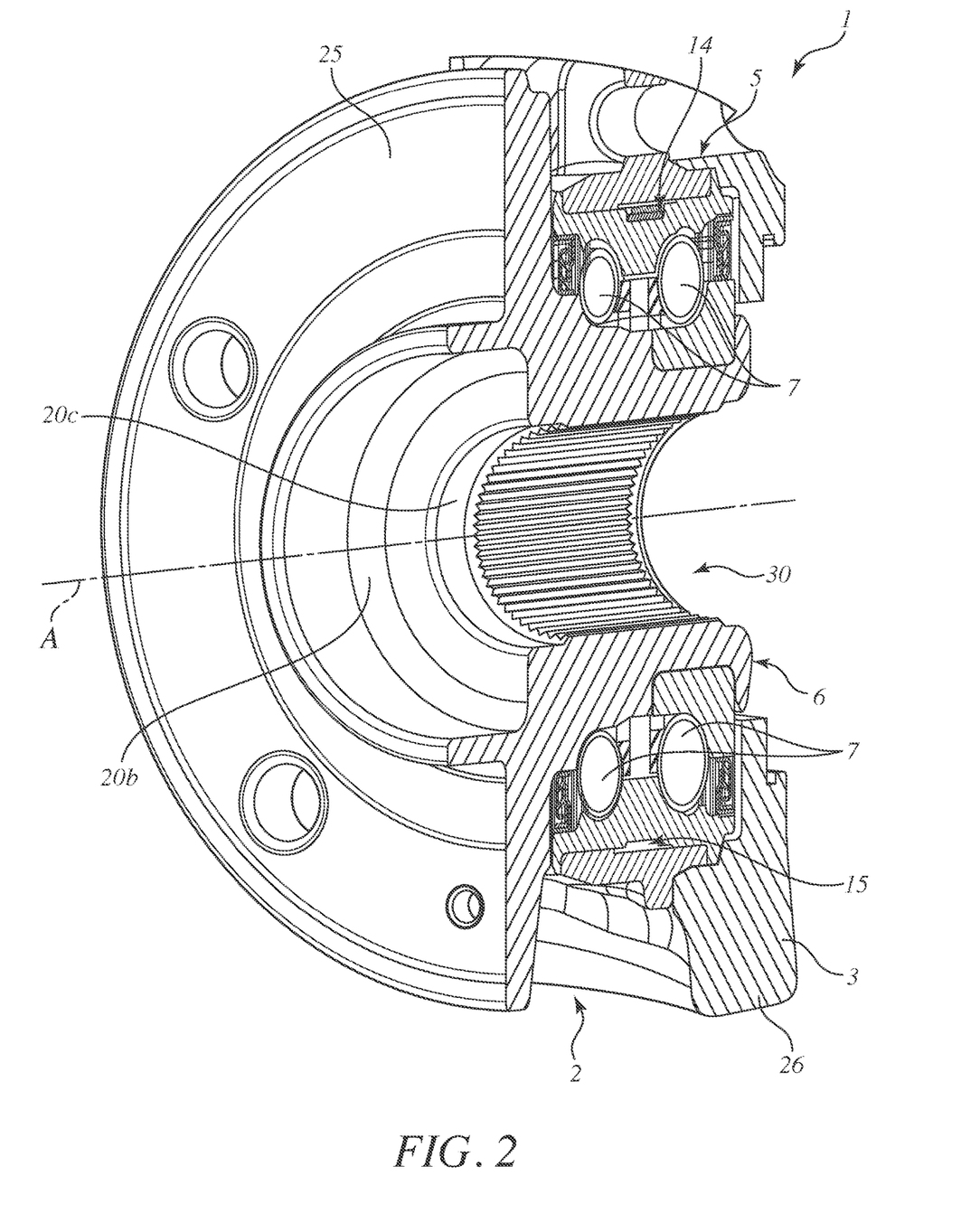
FIG. 2 schematically depicts a front three-quarter perspective view of the vehicle suspension system of FIG. 1 with the hub bearing unit in radial section according to exemplary embodiments of this disclosure.
Figure 3:
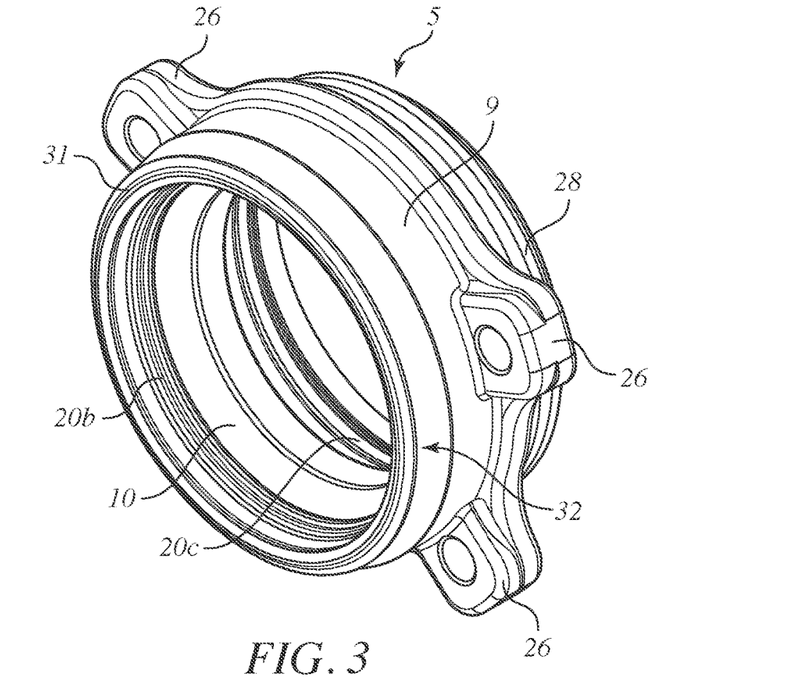
FIG. 3 schematically depicts a front three-quarter perspective view of an outer ring of the hub bearing unit of FIGS. 1 and 2 according to exemplary embodiments of this disclosure.
Figure 4:
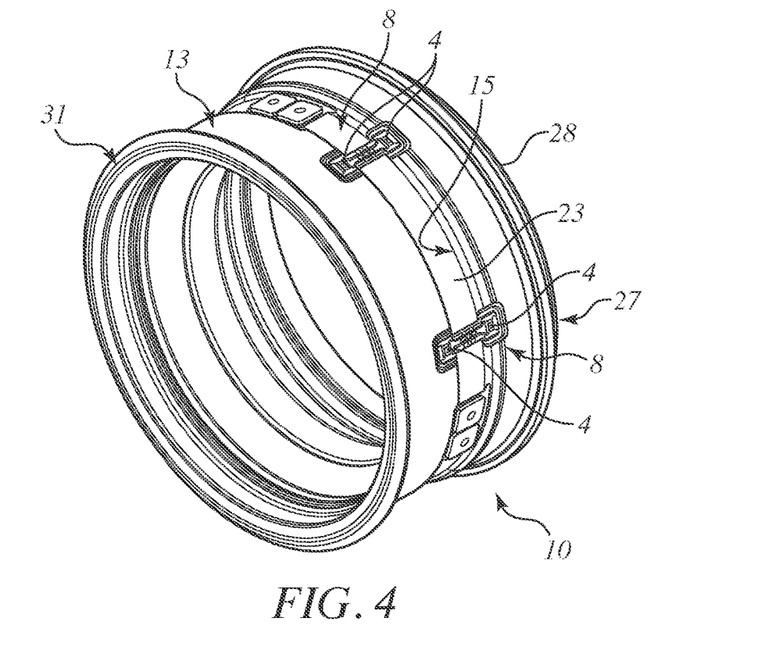
FIG. 4 schematically depicts a component of the outer ring of the hub bearing unit of FIG. 3.
Figure 5:
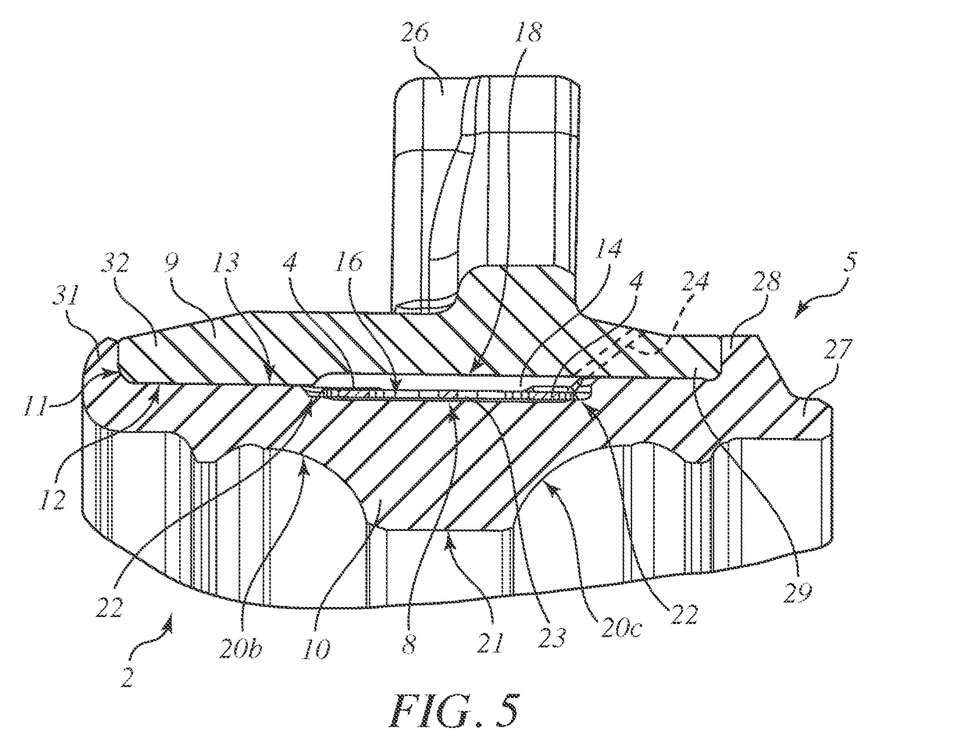
FIG. 5 schematically depicts, on an enlarged scale and in radial section, a detail of the hub bearing unit of FIG. 1.
Figure 6:
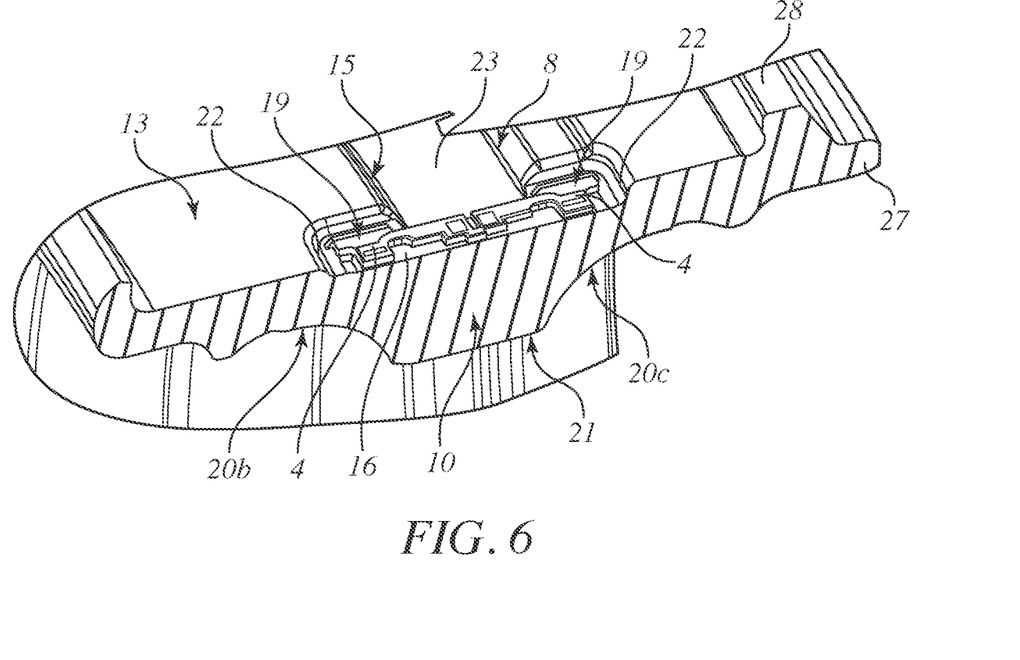
FIG. 6 depicts, on an enlarged scale, a three-quarter perspective view of a detail of the component of the outer ring shown in FIG. 4.

Known suspension systems use sensors able to detect a speed of rotation of each wheel of a vehicle. However, sensorized suspension systems are able to detect stresses placed on a hub bearing unit on which a vehicle wheel is mounted as a result of various driving conditions of a vehicle, such as rough or diverse terrain over which the vehicle is travelling, and maneuvers performed, such as steering and braking, are not currently in use.

For example, U.S. Pat. No. 6,619,102B2 describes a hub bearing unit made up of a rolling bearing, an outer ring of which has a flange for attachment to a suspension upright, provided with radial and circumferential elastic deformation zones, to each of which is applied a single strain sensor. This solution is not only complex and expensive to implement, but also leaves sensors exposed to external contaminants such as dust and moisture and/or to possible damage, both in use and during assembly.

As another example, U.S. Pat. No. 6,658,943B2 describes a rolling bearing with a double row of conical rollers in which a radially outer cylindrical lateral surface of an outer ring of a rolling bearing is provided with four sensor modules, secured circumferentially to the radially outer cylindrical surface and angularly spaced apart from one another. Each module consists of a pair of strain sensors or strain gauges arranged at 90° from one another. This solution leaves sensors exposed to possible contaminants or damage.

Known solutions have proved to be inefficient, unreliable for detecting deformation in real time, and they require repeated recalibration of the sensors.

Known systems are suitable only for performing tests, but are not compatible with mass production and real time detecting during use.

An aim of this disclosure is to provide a sensorized hub bearing unit capable of detecting, in real time, accurately and reliably (i.e. with a high degree of repeatability of the results), magnitude of forces and moments applied, i.e., loads to which a vehicle is subjected while being driven, which is also easy to implement and does not expose the sensor(s) to external contaminants and/or possible damage.

With reference to the figures, a suspension system 1 for a vehicle may include a suspension upright or articulation 3 and a sensorized hub bearing unit 2 configured to be coupled with suspension upright 3. Hub bearing unit 2 may include at least one strain sensor 4 configured to detect mechanical stresses, such as loads, in particular forces and moments, e.g., torque, to which hub bearing unit 2 is subjected.

Hub bearing unit 2 may further include a rolling bearing 30 having a radially outer ring 5, a radially inner ring 6 mounted coaxially and concentrically with outer ring 5, and a plurality of rolling elements 7 interposed between inner ring 6 and outer ring 5, allowing outer ring 5 and inner ring 6 to rotate relative to each other about an axis of symmetry A. In various embodiments, at least one strain sensor 4 may be integral with outer ring 5.

In various embodiments, rolling elements 7 may be divided into two rows of rolling elements 7. A first row of rolling elements 7 of the two rows of rolling elements 7 may engage a pair of annular raceways 20b that face one another and are positioned on a side opposite suspension upright 3. Raceways 20b may be referred to as outboard (OB) raceways because they are located at an outside of the vehicle. A second row of rolling elements 7 of the two rows of rolling elements 7 may engage a pair of annular raceways 20c that face one another and are positioned on a same side as suspension upright 3. Raceways 20c may be referred to as inboard (IB) raceways because they are located at an inside of the vehicle.

Hub bearing unit 2 may be provided with at least one strain sensor 4. In various embodiments, strain sensors 4 may be coupled in twos as a plurality of pairs 8 of sensors 4, spaced circumferentially from one another in a row on outer ring 5.

While described herein as forming pairs 8 of strain sensors 4, it should be appreciated that alternative arrangements of strain sensors 4 may be implemented without departing from the scope of this disclosure. For example, various embodiments may include a plurality of individual strain sensors 4 that are not arranged in pairs.

Strain sensors 4 used according to this disclosure may be different sensor types, such as glued thin film, glued thick film, laser deposited thick film, screen printed thick film, glued silicon-based strain gauge, glued stainless steel substrate with sensor, welded stainless steel substrate with sensor, or glued ceramic substrate with sensor. If a substrate is present, strain sensors 4 may be stainless steel support with stamped thick film, stainless steel substrate with laser deposited thick film, stainless steel substrate with fluid thin film, or silicon-based strain gauge.

In various embodiments, strain sensors 4, or pairs 8 of strain sensors 4, may be different types of sensors for inboard raceway 20c and outboard raceway 20b. Strain sensors 4, of whatever type, individual or in pairs, may be positioned in line with inboard raceway 20c in an angular position (i.e. position considered in a circumferential direction) that is different than strain sensors 4 positioned in line with outboard raceway 20b.

In various embodiments, a stationary ring, e.g., radially outer ring 5, may be formed by rigid and integral coupling of a first annular element 9 and a second annular element 10, arranged coaxially with each other with respect to axis of symmetry A. Second annular element 10 may be radially fitted integrally inside first annular element 9 by force fitting or interference fitting.

In various embodiments, strain sensors 4 may be arranged at an interface 11 between first annular element 9 and second annular element 10.

Interface 11 may be defined between a radially inner cylindrical lateral surface 12 of first annular element 9 and a radially outer cylindrical lateral surface 13 of second annular element 10. In various embodiments, strain sensors 4 may be rigidly secured to second annular element 10.

Strain sensors 4 may be housed inside one or more chambers 14 that are arranged between radially inner lateral surface 12 of first annular element 9 and radially outer lateral surface 13 of second annular element 10. In other embodiments, pairs 8 of strain sensors 4 may be housed in one or more chambers 14. In various embodiments, one or more chambers 14 may be rigidly secured to the radially outer lateral surface 13.

In various embodiments, chambers 14 may be angularly spaced from one another with a constant circumferential spacing, for example six chambers arranged at a spacing of 60°, four chambers arranged at a spacing of 90°, three chambers arranged at a spacing of 120°, or two chambers diametrically opposed to one another at a spacing of 180°. In other embodiments, chambers 14 may be angularly spaced with a non-constant circumferential spacing. In other embodiments, one chamber 14 may house strain sensors 4.

Chambers 14 may be connected by an annular channel formed on an annular groove 15 made in radially outer lateral surface 13 of annular element 10. In various embodiments, annular groove 15 and chambers 14 may be closed off by a fluid tight seal. The fluid tight seal may be formed by radially inner lateral surface 12.

Each chamber 14 may be defined between a shallow space/recess 16 formed on radially outer lateral surface 13 and a portion 18 of radially inner lateral surface 12 facing shallow space 16 and covered by shallow space 16, forming a substantially fluid tight seal.

In various embodiments, strain sensors 4 may be made of a piezoresistive ceramic material rigidly secured to a steel plate 19 straddling shallow space 16 and oriented circumferentially. Steel plate 19 may be welded onto radially outer lateral surface 13.

In embodiments including pairs 8 of strain sensors 4, strain sensors 4 may be designed as small units with two deformation-sensitive elements stamped on a substrate, e.g., steel plate 19. The deformation-sensitive elements may be connected to electrically conducting paths leading to a center of the unit where conducting contacts are stamped. These conducting contacts are used to connect strain sensors 4 to electronics disposed inside or outside hub bearing unit 2.

In other embodiments, electronics are located in the empty space that contains strain sensors 4, i.e. at interface 11 between annular elements 9 and 10. The electronics may be positioned directly on a same substrate as strain sensors 4 and mounted using, e.g., a "chip-on-board" method where necessary (for example in embodiments using a silicon-based components). Alternatively, the electronics may be positioned in another circumferential position when they are connected to each strain sensor 4 using a flexible stamped circuit or insulated electrical wires. With these design options, the electronics enjoy protection from an external environment as strain sensors 4 do.

In various embodiments, a plurality of pairs 8 of strain sensors 4 may be angularly spaced apart between first annular element 9 and second annular element 10.

Strain sensors 4 of each pair 8 of strain sensors 4 may be further arranged in line with (i.e. "above") a pair of respective annular raceways 20b and 20c for rolling elements 7, formed on a radially inner lateral surface 21 of second annular element 10.

Each strain sensor 4 of each pair 8 of strain sensors 4 may be housed transversely and circumferentially in a respective end 22 of a corresponding shallow space 16.

Each shallow space 16 may have two opposite enlarged ends 22 and may be oriented circumferentially. In various embodiments, enlarged ends 22 extend circumferentially further than shallow space 16. Each shallow space 16 may extend along a length, measured between two opposite enlarged ends 22, and be oriented axially parallel to axis A such that each shallow space 16 extends until it is in line with (and at least partially above) both raceways 20b and 20c, and between these raceways. In various embodiments, raceways 20b and 20c may be arranged side by side and adjacent to each other.

In this way, each shallow space 16 may house a respective pair 8 of strain sensors 4, each strain sensor 4 arranged at an enlarged end 22 substantially in line radially with an underlying raceway 20b, 20c.

Each shallow space 16 may moreover be connected to a plurality of shallow spaces 16 formed angularly spaced from each other in second annular element 10 by means of annular groove 15, positioned axially parallel to axis A, between each pair 8 of strain sensors 4.

Annular groove 15 may additionally house a multi-channel electrically conducting annular band 23 (or a plurality of insulated electrical wires), electrically insulated and electrically connected to each strain sensor 4. In various embodiments, multi-channel electrically conducting annular band 23 may be a plurality of insulated electrical wires. Conducting band 23 may be configured to receive electrical signals emitted by strain sensors 4 following mechanical deformation of outer ring 5 and transmit electrical signals to a vehicle control unit (not shown for simplicity of illustration). In various embodiments, conducting band 23 may transmit electrical signals via a hole 24 passing transversely through annular element 9 in a radial or inclined direction. Conducting band 23 may further transmit electrical signals via an axial hole or furrow duly made through one or both of annular elements 9 and 10. Hole 24 may be configured to house an electrical connection to a vehicle control unit.

In various embodiments, hub bearing unit 2 may be entirely made up of rolling bearing 30 alone. In such embodiments, stationary outer ring 5 may be directly attached to suspension upright 3 and rotating inner ring 6 may be provided with a radially protruding flange 25 for directly receiving a wheel of a vehicle on a side opposite suspension upright 3. This type of rolling bearing may be referred to as "third generation" or "biflanged" rolling bearing.

In various embodiments, a second or first generation rolling bearing having a single flange or no flange, respectively, may be used without departing from the scope of this disclosure. In embodiments having a second generation rolling bearing 30, stationary outer ring 5 may be secured to suspension upright 3 by means of a flange, radial lugs, or other means of mechanical attachment, such as screws or bolts, while rotating inner ring 6 may be rigidly secured to a spindle including an attachment flange for a vehicle wheel. In an embodiment having a first generation rolling bearing 30, stationary outer ring 5 may be secured to suspension upright 3 by being fitted in a suitable seat.

In various embodiments, first annular element 9 may have a radially protruding flange, e.g., flange 25, on a radially outer side. A plurality of connection lugs 26 may further be configured to angularly, rigidly secure outer ring 5 to suspension upright 3 by means of screws or bolts (not shown for simplicity of illustration).

Because stationary outer ring 5 may be divided into annular elements 9 and 10 coupled to one another, technical and design constraints regarding axial and angular positions of either means of attachment, e.g., lugs 26, flange 25, strain sensors 4, and chambers 14 are reduced.

In various embodiments, a first end 27 of second annular element 10 may have an annular edge 28 projecting radially from radially outer lateral surface 13 of second annular element 10 and coupled in axial abutment against a corresponding first end 29 of first annular element 9. Annular edge 28 may create a shoulder which thus prevents undesired axial movement between annular elements 9 and 10 coupled reciprocally.

A second end 31 of second annular element 10, arranged opposite first end 27, may project axially in a cantilever fashion from a corresponding second end 32 of first annular element 9. Second end 31 may be upset-forged, by orbital forging, for example, so as to tightly clamp first annular element 9 between annular edge 28 of first end 27 and second end 31 of second annular element 10. In this way, reciprocal coupling between first annular element 9 and second annular element 10 may be improved.

Forming a stationary outer ring 5 by assembly of annular elements 9 and 10 in this way helps prevent relative axial movement between annular elements 9 and 10. In various embodiments, first annular element 9 and second annular element 10 may be assembled by laser welding or friction welding beads, by snap rings or other threaded elements, such as bolts, or by hot or cold forging.

Laser welding by continuous welding beads may ensure that interface 11 is completely sealed with a fluid tight seal. In this way, both strain sensors 4 and chambers 14, with the associated electronics, are completely sealed by a fluid tight seal.

While a fluid tight seal of interface 11 may be ensured by force fitting lateral surfaces 12 and 13, the fluid tight seal is enhanced by rigidly securing annular elements 9 and 10 to one another by means of continuous laser welding. The fluid tight seal may similarly be enhanced by means of orbital forging and a shoulder, for example with an insertion of seals (not shown for simplicity of illustration) between annular elements 9 and 10.

Annular elements 9 and 10 may be made rigidly integral, for example by plastic deformation, by laser or friction welding, by mechanical locking, e.g., by means of a snap ring, or by means of a threaded flange.

In various embodiments, annular element 9 may be angularly connected, e.g., by force fitting, and axially, rigidly secured to annular element 10, forming therewith a single element constituting stationary outer ring 5. Interface 11 may additionally use a system for angular connection, such as flat parts.

In various embodiments, shoulder 28 and second end 31 (or equivalent locking means such as welding beads or mechanical elements) may be formed on annular element 9 instead of on annular element 10. In such embodiments, annular element 9 may be axially longer than annular element 10.

Therefore, it does not matter which of annular elements 9 and 10 has a first end 27 with an annular edge 28 projecting radially in axial abutment against a corresponding first end 29 of a first annular element, while enlarged opposite ends 31 project axially from a second end 32 of a second annular element. In these embodiments, annular elements 9 and 10 may be made rigidly integral by plastic deformation, by laser or friction welding, by mechanical locking by means of a snap ring, or by means of a threaded flange.

While the present disclosure describes a rotating inner ring 6 and a stationary outer ring 5, it should be appreciated that in alternative embodiments, inner ring 6 may be stationary and outer ring 5 may rotate without departing from the scope of the disclosure. In embodiments in which inner ring 6 is stationary, inner ring 6 may be formed by means of force fitting two annular elements, and strain sensors 4 may be rigidly secured to a radially inner lateral surface of an outermost radially annular element thereof.

Strain sensors 4 may be completely protected from impacts or other damage and from any external contaminants, and therefore work reliably. Furthermore, an intermediate position at interface 11 ensures more accurate and reliable signals.

During assembly of rolling bearing 30 and hub bearing unit 2 on suspension upright 3, deformation caused by attachment bolts mainly concerns annular element 9, which may not have strain sensors 4 housed thereupon. Thus, strain sensors 4 may not be affected by deformation, allowing more accurate sensing of deformation of raceways 20*b* and 20*c*. Separation of the stationary ring of the rolling bearing into two parts obviates a connection between mounting bolts and raceways/surfaces coupled to strain sensors 4.

By dividing the stationary ring into two parts, complete protection against contaminants, e.g., water, moisture, dirt, present in an external environment outside of chamber 14 in which each sensor 4 is positioned may be achieved.

We claim:
1. A sensorized hub bearing unit, comprising:
    a rolling bearing comprising:
        a stationary ring comprising:
            a first annular element; and
            a second annular element coupled to and arranged coaxial with the first annular element, the second annular element comprising:
                a plurality of axial spaces angularly spaced from one another and positioned at an interface between the first annular element and the second annular element, and
an annular groove;
a rotating ring mounted coaxially and concentrically with the stationary ring;
a plurality of rolling elements interposed between the rotating ring and the stationary ring; and
a plurality of sensors for detecting mechanical stresses, each pair of sensors being housed within a respective axial space of the plurality of axial spaces; and
an annular band disposed within the annular groove of the second annular element,
wherein the first annular element is integrally fitted axially within the second annular element, and
each sensor of the plurality of pairs of sensors is electrically connected to one another by the annular band.

2. The sensorized hub bearing unit according to claim 1, wherein the interface between the first annular element and the second annular elements is defined between an outermost radially inner cylindrical lateral surface of the first annular element and a radially outer cylindrical lateral surface of the second annular element.

3. The sensorized hub bearing unit according to claim 2, wherein the second annular element further comprises:
a first end provided with an annular edge extending radially in a cantilever fashion and coupled axially to a corresponding first end of the first annular element; and
a second end of the second annular element opposite the first end protruding axially in a cantilever fashion from a second end of the first annular element,
wherein the second end of the first annular element and the second end of the second annular element are made rigidly integral by plastic deformation, laser or friction welding, a snap ring, or a threaded flange.

4. The sensorized hub bearing unit according to claim 2, wherein the stationary ring is a radially outer ring of the rolling bearing and the rotating ring is a radially inner ring of the rolling bearing, and wherein each strain sensor of the plurality of pairs of strain sensors is integrally fixed integral on the radially outer surface of the second annular element.

5. The sensorized hub bearing unit according to claim 4, wherein the plurality of pairs of strain sensors are housed within a chamber disposed between the radially inner lateral surface of the first annular element and the radially outer lateral surface of the second annular element.

6. The sensorized hub bearing unit according to claim 5, wherein the chamber is bounded between a space, formed on the radially outer lateral surface of the second annular member, and a portion of the radially inner lateral surface of the first annular member facing the space.

7. The sensorized hub bearing unit according to claim 6, wherein the plurality of pairs of strain sensors are selected from the group consisting of glued thin film, glued thick film, laser deposited thick film, screen printed thick film, glued silicon-based strain gauge, glued stainless steel substrate with sensor, welded stainless steel substrate with sensor, and glued ceramic substrate with sensor.

8. The sensorized hub bearing unit according to claim 6, wherein each strain sensor of each pair of strain sensor is arranged at a respective annular track formed on a radially inner lateral surface of the second annular element.

9. The sensorized hub bearing unit according to claim 4, wherein the second annular element further comprises:
a first end provided with an annular edge extending radially in a cantilever fashion and coupled axially to a corresponding first end of the first annular element; and
a second end of the second annular element opposite the first end protruding axially in a cantilever fashion from a second end of the first annular element,
wherein the second end of the first annular element and the second end of the second annular element are made rigidly integral by plastic deformation, laser or friction welding, a snap ring, or a threaded flange.

10. The sensorized hub bearing unit according to claim 1, wherein the first annular element further comprises a radially outer flange configured to attach the outer ring to a suspension upright of a vehicle.

11. The sensorized hub bearing unit according to claim 1, wherein each strain sensor of each pair of strain sensors arranged at a respective annular track formed on a radially inner lateral surface of the second annular element.

12. The sensorized hub bearing unit according to claim 1, wherein the second annular element further comprises:
a first end provided with an annular edge extending radially in a cantilever fashion and coupled axially to a corresponding first end of the first annular element; and
a second end of the second annular element opposite the first end protruding axially in a cantilever fashion from a second end of the first annular element,
wherein the second end of the first annular element and the second end of the second annular element are made rigidly integral by plastic deformation, laser or friction welding, a snap ring, or a threaded flange.

13. A sensorized hub bearing unit, comprising:
a rolling bearing comprising:
a stationary ring comprising:
a first annular element; and
a second annular element coupled to and arranged coaxial with the first annular element, the second annular element comprising:
a plurality of axial spaces angularly spaced from one another and positioned at an interface between the first annular element and the second annular element, each axial space comprising two axial ends that are circumferentially enlarged relative to remaining portions of each axial space; and
an annular groove;
a rotating ring mounted coaxially and concentrically with the stationary ring;
a plurality of pairs of sensors for detecting mechanical stresses fixed integrally with a radially outer surface of the second annular element;
at least one chamber defined by each axial space and an outer lateral surface of the first annular element and positioned at the interface between the first annular element and the second annular element, and
an annular band disposed within the annular groove of the second annular element,
wherein, each pair of sensors is housed within a respective axial space of the plurality of axial spaces and arranged at a respective annular track formed on a radially inner lateral surface of the second annular element,
each sensor of each pair of sensors is housed within a respective axial end of each axial space,
the first annular element is integrally fitted axially within the second annular element, and
each sensor of the plurality of pairs of sensors are electrically connected by the annular band.

14. The sensorized hub bearing unit according to claim 13, wherein the first annular element further comprises a radially outer flange configured to attach the outer ring to a suspension upright of a vehicle.

15. The sensorized hub bearing unit according to claim 14, wherein the second annular element further comprises:
- a first end provided with an annular edge extending radially in a cantilever fashion and coupled axially to a corresponding first end of the first annular element; and
- a second end of the second annular element opposite the first end protruding axially in a cantilever fashion from a second end of the first annular element, wherein the second end of the first annular element and the second end of the second annular element are made rigidly integral by plastic deformation, laser or friction welding, a snap ring, or a threaded flange.

* * * * *